United States Patent [19]

Buckley et al.

[11] 4,191,252

[45] Mar. 4, 1980

[54] METHOD FOR THE RECOVERY OF OIL

[75] Inventors: Peter S. Buckley, Dyce, Scotland; Dennis M. Grist, Chertsey, England

[73] Assignee: The British Petroleum Company Limited, Sunbury-on-Thames, England

[21] Appl. No.: 907,622

[22] Filed: May 19, 1978

[30] Foreign Application Priority Data

May 23, 1977 [GB] United Kingdom ............... 21569/77

[51] Int. Cl.$^2$ ............................................. E21B 43/24
[52] U.S. Cl. ..................................... 166/272; 166/303
[58] Field of Search ............... 166/271, 273, 274, 272, 166/303

[56] References Cited

U.S. PATENT DOCUMENTS

| 3,204,694 | 9/1965 | Johnson, Jr. et al. | 166/272 X |
| 3,357,487 | 12/1967 | Gilchrist et al. | 166/272 X |
| 3,454,095 | 7/1969 | Messenger et al. | 166/303 |
| 3,474,864 | 10/1969 | Hurd | 166/272 |
| 3,490,531 | 1/1970 | Dixon | 166/261 X |
| 3,515,214 | 6/1970 | Finch | 166/272 |
| 3,700,031 | 10/1972 | Germer, Jr. et al. | 166/274 X |
| 3,706,341 | 12/1972 | Redford | 166/272 X |
| 3,732,926 | 5/1973 | Brown et al. | 166/272 |
| 3,797,574 | 3/1974 | Feuerbacher et al. | 166/274 |
| 3,854,531 | 12/1974 | Carlin | 166/272 |
| 4,119,149 | 10/1978 | Wu | 166/272 X |

FOREIGN PATENT DOCUMENTS 1298306  11/1972  United Kingdom ..................... 166/272

*Primary Examiner*—Stephen J. Novosad
*Assistant Examiner*—George A. Suchfield
*Attorney, Agent, or Firm*—Morgan, Finnegan, Pine, Foley & Lee

[57] ABSTRACT

Recovery of heavy oil involves injecting a solvent eg. toluene for the oil in admixture with either (i) a steam distillable surfactant eg.butylamine or (ii) a short lived surfactant eg. a petroleum sulphonate and then injecting steam.

3 Claims, No Drawings

METHOD FOR THE RECOVERY OF OIL

The present invention relates to a process for the treatment of a viscous oil reservoir to increase the water permeability of the reservoir and also to a process for the recovery of oil. Viscous oil reservoirs are also known as tar sands and heavy oil reservoirs, and are reservoirs having a crude oil viscosity at reservoir temperature greater than 50 centipoises.

It is known that in order to recover viscous crude oils from subterranean reservoirs some method of injecting or generating heat in the reservoir in order to reduce the crude oil viscosity is required. Steam has been widely used as a convenient heat carrier. A commonly practiced technique is that known as cyclic steam injection. In this technique steam is injected down a well in a viscous oil reservoir for a period. The steam injection is then stopped and oil is allowed to flow from the same well.

It has been previously proposed in U.S. Pat. No. 3,357,487 to inject, prior to injection of steam, a solvent for the oil, the solvent containing a surfactant which is miscible with the water or the oil and stable at temperatures of at least 650° F.

The presence of surfactant increases the efficiency of the solvent. However, with the surfactants previously described there is a risk that the surfactant will be produced with the oil as an emulsion which is difficult to separate. It is an object of the invention to lessen this problem.

An improved method has now been devised in which the surfactant is either thermally labile or one that is steam distillable with the result that the surfactant is either removed or destroyed before the end of the steam injection step.

According to the present invention a process for the treatment of a viscous oil reservoir to increase the water permeability of the reservoir prior to steam injection which process comprises injecting a solvent for the oil down a well in the reservoir wherein the solvent is steam distillable and contains a surfactant which is either (i) steam distillable so that the solvent and surfactant are caused to penetrate the reservoir by the steam and be present in the zone where the steam condenses the surfactant also being adsorbable on the reservoir rock so as to be adsorbed before reaching the production well or (ii) thermally labile under steam injection conditions so that the surfactant properties can be lost before the end of the subsequent steam injection.

The steam injection and the oil recovery steps can be those of a conventional cyclic steam recovery process or of a steam drive process.

By the term steam distillable solvent we mean a solvent which has a vapor pressure curve close to that of water. It is preferred that the solvent employed shall be capable of dissolving the asphaltenes present in the crude oil and therefore preferred solvents are those having an aromatic contact of at least 25%. By aromatic content we mean that determined by fluorescent indicator absorption by ASTM D1319. The suitability of a solvent may be readily determined by shaking a sample of the crude oil with an approximately equal volume of the solvent to see whether or not solution occurs. It is advisable to study the test solution under a microscope to ensure that no small insoluble particles, ie. less than 1, are present. Preferred solvents may vary according to the nature of the viscous oil but suitable steam distillable solvents are toluene, refined oils e.g. kerosine naphtha, gasoline and steam cracked gasoline. Other solvents such as pyridine, cyclohexane, chloroform, may also be used.

The addition of the solvent greatly increases the amount of steam that can be injected into the well and the quantity chosen is determined empirically in connection with each well so that the desired amount of steam is injected.

Steam under pressure can be at temperatures up to 350° C. and therefore it is possible to heat the oil in the reservoir up to this temperature. By choosing a surfactant that decomposes below this temperature and then operating the steam heating step so that those parts of the reservoir in which the surfactant is injected are heated above the decomposition temperature of the surfactant, the latter can be destroyed. Examples of such thermally labile surfactants are the petroleum sulphonates which are sometimes referred to as alkaryl sulphonates or alkaryl napthenic sulphonates. They may be employed as sodium, potassium, ammonium or substituted ammonium salts. They can be obtained by sulphonating at least a portion of a sulphonatable hydrocarbon (eg. gas oils) and then neutralizing the product with an appropriate alkali. Typical commercially available sulphonates may contain from 5 to 100% active sulphonate. Most commercially available petroleum sulphonates will break down at the elevated temperatures and pressures induced in a viscous oil reservoir by steaming (e.g. a petroleum sulphonate of molecular weight 460 was found to decomposes above 210° C.). Their ability to break down may readily be assessed by thermal gravimetric analysis in the laboratory. Preferred materials have an average molecular weight of 360 to 520 and preferably from 430 to 480. The sulphonate can be a mixture of low and high molecular weight materials. Synthetic alkyl benzene sulphonates and alkyl benzene disulphonates can also be employed proved they have the required thermal instability.

Other anionic surfactants that can be employed are the alkyl ethoxy sulphates and the alkyl phenol ethoxy sulphates. Generally such materials are thermally unstable and can therefore be used in the process of the present invention.

The steam distillable surfactant which is adsorbable on the reservoir rock can be amine, for example a primary alkyl-amine (particularly butylamine, hexylamine and dodecylamine), branch chain alkylamines (e.g. polyisobutylamines) and secondary and tertiary alkylamines. These materials are readily adsorbed on the rock/sand surfaces present in a viscous oil reservoir and hence removed from the fluids therein.

The quantity of surfactant employed can be varied considerably but clearly it is undesirable to employ more surfactant than is necessary to attain the desired improvement in the ability of the solvent to clear oil from the porous structure at the opening of the well into the reservoir and thus increase the quantity of steam that can be injected. The presence of the more expensive surfactant increases the efficiency of the relatively cheaper solvent and thus enables a small quantity of a solvent to be employed. Generally an economical amount of surfactant to employ lies in the range 0.1 to 5.0 percent by weight of the solvent.

Conventional techniques may be employed to inject the surfactant/solvent solution and the steam into the heavy oil reservoir and to recover oil therefrom.

The reasons for the success of the process according to the present invention are not at present clear but it is believed that the solvent/surfactant mixture increases injectivity in the first part of the steam injection cycle, ie. while cold condensed steam enters the formation. Reduction of interfacial tension reduces capillary pressures and the solvent diluted crude oil with lower viscosity is in part displaced from conducting capillaries. As the point of entry warms up, live steam will enter and it is thought that the solvent moves ahead with the steam in the gas phase and condenses further out in the reservoir. This solvent reduces the viscosity of the crude oil and thus increases its mobility; this then increases the steam injectivity of the well.

The following examples illustrate how the use of a solvent/surfactant mixture can increase the water permeability of a simulated heavy oil reservoir. This is thought to be important in the improvement of injectivity of steam because it is the water permeability which controls the amount of steam that can be injected in the early stages of the steam injection step.

EXAMPLE 1

A bed of an oil sand mixture was prepared by saturating sand with reservoir water and then pumping a Cold Lake heavy crude oil through the bed to displace the water and saturate the bed with oil. The bed was maintained at 276° C. and was then treated with a 2% by weight solution of ammonium petroleum sulphonate in toluene. The volume of solution employed was equivalent to half the pore volume of the bed. The temperature of the solution injected was 22° C.

Before treatment the water permeability of the bed was 0.8 Darcy and after treatment it was 2.8 Darcy.

EXAMPLE 2

Two further oil sand beds were made up as described in Example 1 held at 276° C. and treated at 22° C. with half pore volumes of (a) aromatic kerosine and (b) aromatic kerosine (aromatic content 30%) containing 1.3% by weight of ammonium petroleum sulphonate. With the bed treated with the aromatic kerosine on its own the initial water permeability was less than 0.1 Darcy whereas after treatment its permeability was 1.16 Darcy.

With the other bed in which the ammonium petroleum sulphonate was present in the kerosine the initial water permeability of the bed was 0.7 Darcy and after treatment it had risen to 2.2 Darcy. It will be noted that the permeability of the treated bed was higher in the case when the solvent included a surfactant. The sulphonate used in these two examples has a molecular weight of about 460 and decomposes at temperatures above 210° C.

EXAMPLE 3

A sand bed was prepared from sand derived from the Cold Lake area of Canada as described in Example 1 and maintained at 276° C.

The water permeability of the bed was 0.30 Darcy.

The bed was then treated with 0.3 bed pore volume of 1% n hexylamine in kerosine solvent (aromatic content 30% wt.) introduced at 22° C.

The water permeability after treatment was 1.94.

EXAMPLE 4

Example 3 was repeated except that 0.3 bed pore volume of 1% n butylamine in kerosine (aromatic content 30%) was employed.

The water permeability of the bed before treatment was 0.18 Darcy and after treatment 0.50 Darcy.

COMPARATIVE EXPERIMENT A

Example 3 was repeated except 0.3 bed pore volume of the kerosine was used alone.

In the first of two runs the water permeability before treatment was 0.1 Darcy and after treatment was 0.51 Darcy. In the second run the water permeability before and after treatment was 0.36 and 0.82 respectively.

We claim:

1. A process for the treatment of a viscous oil reservoir to increase the water permeability of the reservoir prior to steam injection which process comprises injecting a solvent for the oil down a well in the reservoir wherein the solvent is steam distillable, has an aromatic content of at least 25% and contains a primary alkylamine surfactant which is steam distillable so that the solvent and surfactant are caused to penetrate the reservoir by the steam and be present in the zone where the steam condenses the surfactant also being adsorbable on the reservoir rock so as to be adsorbed before reaching the production well.

2. A process as claimed in claim 1 wherein the amount of surfactant employed is from 0.1 to 5.0 percent by weight of the solvent.

3. A process for the recovery of oil from a viscous oil reservoir which comprises injecting a solvent for the oil down a well in the reservoir, injecting steam down the well, and producing oil through said well or another well in the reservoir, wherein the solvent is steam distillable and has an aromatic content of at least 25% and contains a primary alkylamine surfactant which is steam distillable so that the solvent and surfactant are caused to penetrate the reservoir by the steam and be present in the zone where the steam condenses the surfactant also being adsorbable on the reservoir rock so as to be adsorbed before reaching the production well.

* * * * *